United States Patent [19]
Habib

[11] Patent Number: 5,626,203
[45] Date of Patent: May 6, 1997

[54] ACTIVE CONTROL OF A VEHICLE OCCUPANT'S BODY IN FRONTAL COLLISION

[76] Inventor: Mostafa S. Habib, Dept. of Mech. Eng., Univ. of Bahrain, P.O. Box 32038, Bahrain, Bahrain

[21] Appl. No.: 551,707

[22] Filed: Nov. 1, 1995

[51] Int. Cl.$^6$ .................................................. B60K 28/10
[52] U.S. Cl. ..................... 180/274; 297/216.18
[58] Field of Search ..................... 180/274, 271; 297/216, 216.18; 296/65.1, 68.1; 244/122 R, 122 AG

[56] References Cited

U.S. PATENT DOCUMENTS

| | | | |
|---|---|---|---|
| 3,992,046 | 11/1976 | Braess | 297/216.18 |
| 4,232,895 | 11/1980 | Yoshio et al. | 296/68.1 |
| 5,344,204 | 9/1994 | Liu, Yanzhao | 296/68.1 |

FOREIGN PATENT DOCUMENTS

| | | | |
|---|---|---|---|
| 9422692 | 11/1994 | WIPO | 297/216.18 |

*Primary Examiner*—Christopher P. Ellis
*Attorney, Agent, or Firm*—William D. Stokes

[57] ABSTRACT

An active control of a vehicle occupant's body in a frontal collision including a double-acting hydraulic cylinder connected between a vehicle seat frame and a vehicle frame upon which the seat frame is slidabley mounted for movement in a longitudinal direction relative to the vehicle. The seat frame is releasably fixed to the vehicle frame by a solenoid actuated detent controlled by a microprocessor electrically connected to an accelerometer. A linear variable differential transformer measures the linear position of the seat and a rotary variable differential transformer measures the angular motion of the occupant's body. The transformers transmit signals to the microporcessor which in turn transmits signals responsive thereto to a directional control valve which controls the hydraulic fluid supplied to and exhausted from the double-acting hydraulic cylinder for controlling the forward sliding movement of the seat depending upon the severity of the impact level.

8 Claims, 4 Drawing Sheets

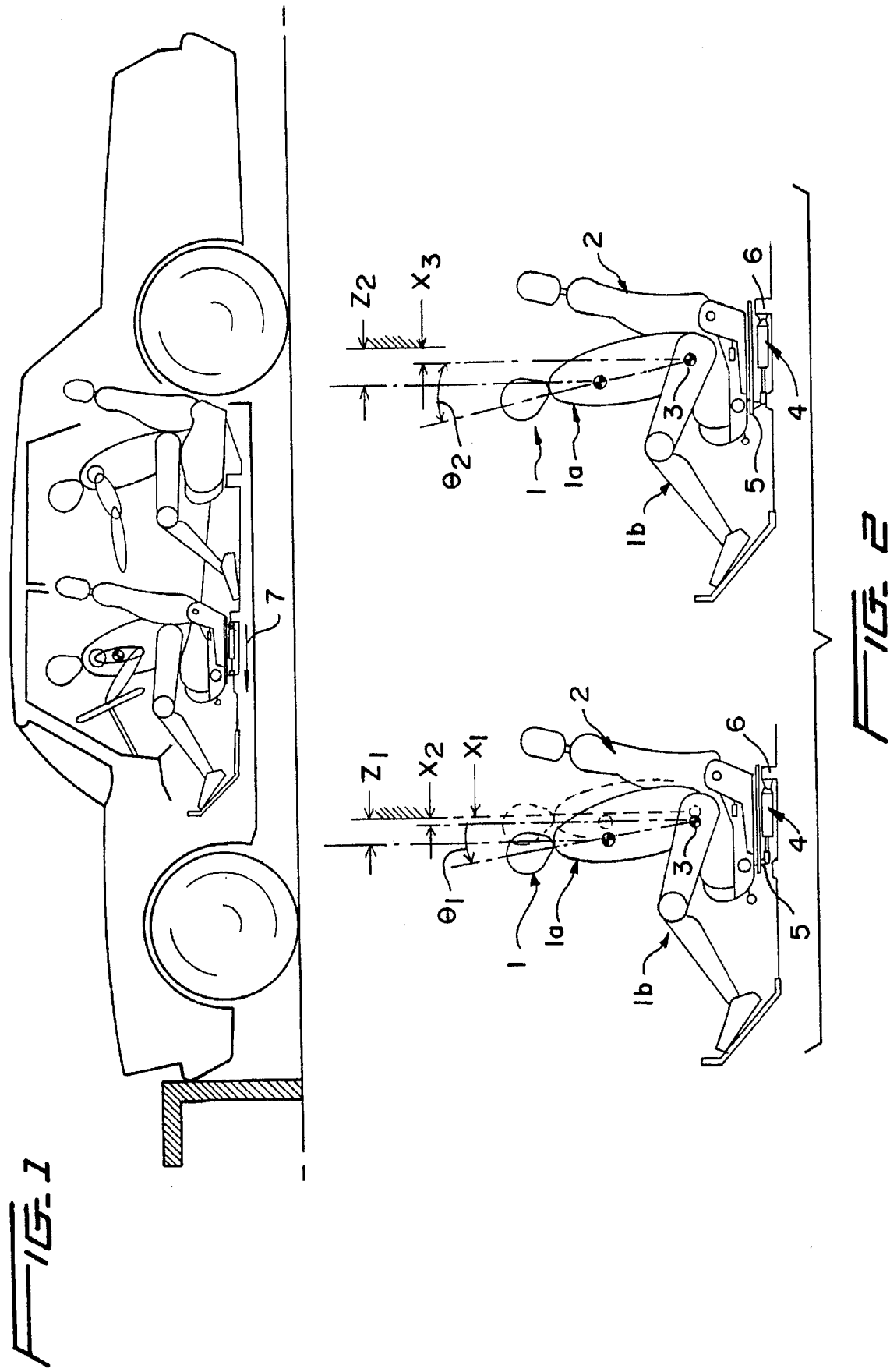

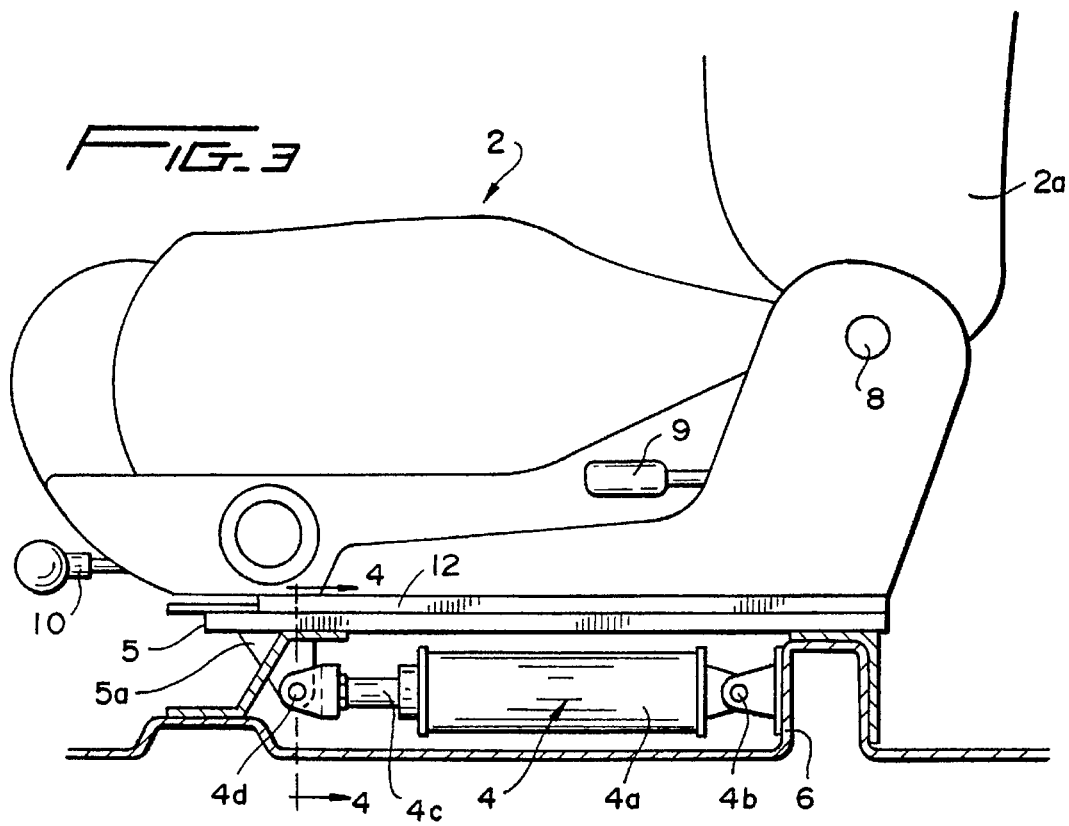
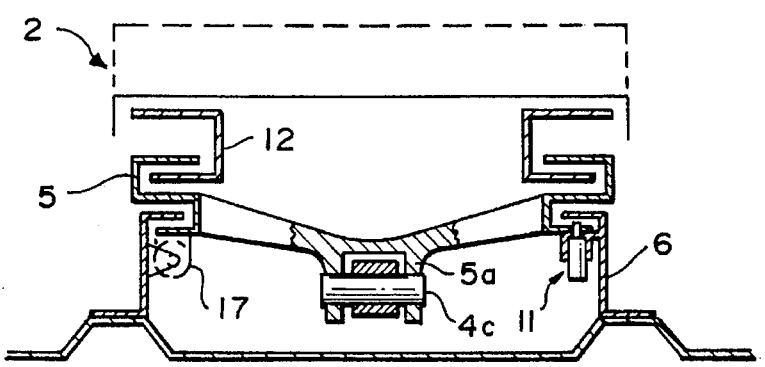
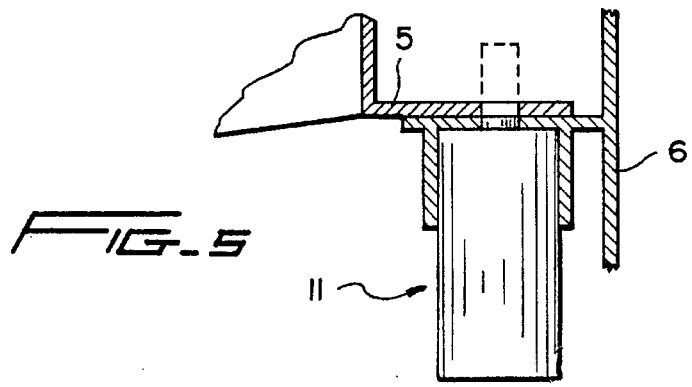

ACTIVE CONTROL OF A VEHICLE OCCUPANT'S BODY IN FRONTAL COLLISION

BACKGROUND OF THE INVENTION

Even though efforts have been made to provide greater passive safety for vehicle occupants by the use of seat belts and air bags, accident statistics indicate front end collisions remain as the major accident type, resulting in fatalities and severe injuries. In automatic restraint systems, the air bag prevents the vehicle occupant's head and upper body from impacting the steering wheel, and the seat belt tightener takes up seat belt slack, applying a distributed load over the occupant's body contact area, to thereby allow the passenger to decelerate through the course of the collision. At sever impact levels, these contact forces may, however, result in facial bone fractures, and head-neck trauma.

After considerable research and experimentation the assembly of the present invention has been devised to provide an active control of a vehicle occupant's body, without applying direct contact forces to the occupant's body, and supplementing the passive safety systems provided by seat belts and air bags.

SUMMARY OF THE INVENTION

The control assembly of the present invention comprises, essentially, a double acting hydraulic cylinder operatively connected between a vehicle seat frame and vehicle frame upon which the seat frame is mounted for slidable movement in a longitudinal direction relative to the vehicle. Hydraulic fluid is supplied to the hydraulic cylinder in a controlled manner, whereby a force is applied to the vehicle seat in a direction opposite to that of the impact force, to thereby control the forward sliding movement of the seat depending upon the severity of the impact level.

BRIEF DESCRIPTION OF THE DRAWINGS

FIG. 1 is a diagrammatic view illustrating the angular position of the upper body portion of a vehicle occupant after a front end collision.

FIG. 2 is a diagrammatic view illustrating the active control of the vehicle seat and occupant's body after impact.

FIG. 3 is an enlarged side elevational view partly in section, showing the hydraulic cylinder connected between the vehicle frame and the vehicle seat frame which is slidably mounted on the vehicle frame.

FIG. 4 is a view taken along line 4—4 of FIG. 3.

FIG. 5 is an enlarged, fragmentary sectional view showing the solenoid actuated pin for releasably locking the seat frame on the vehicle frame.

DESCRIPTION OF THE PREFERRED EMBODIMENT

Figure 6:
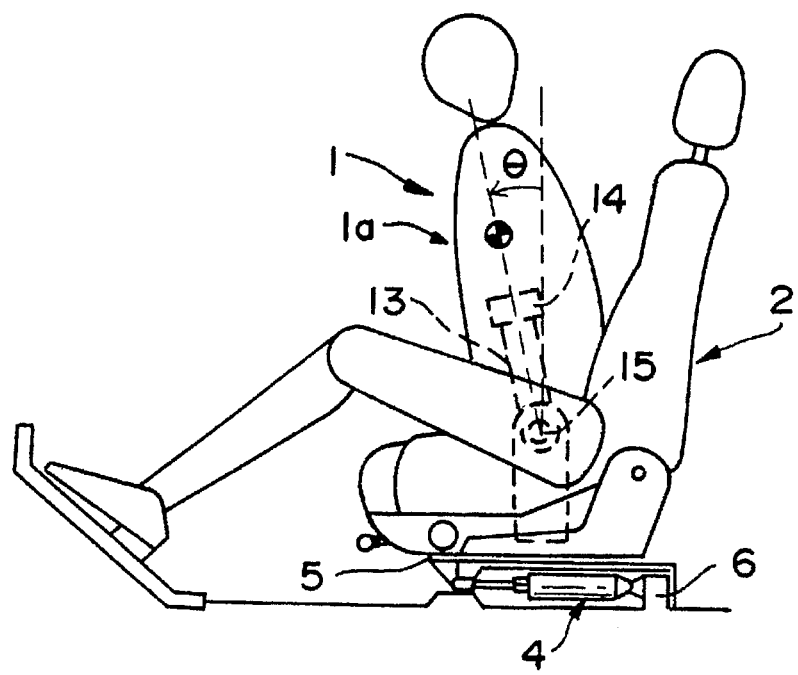
FIG. 6 is a diagrammatic view of the vehicle occupant having a sensor operatively connected thereto for determining the angular position of the occupant.

Referring to the drawings and more particularly to FIGS. 1 and 2, the motion of an occupant 1 and vehicle seat 2 are illustrated during a front end collision. In this instance the occupant's upper body 1a, viz., the head, and upper and center torso, is considered a rigid body hingedly connected as at 3 to the occupant's lower body 1b, viz., the lower torso and legs, fixed to the seat 2 by a seat belt.

To control the motion of the occupant 1 strapped in the seat 2, a double acting hydraulic cylinder 4 is connected between the vehicle seat frame 5 and vehicle frame 6 upon which the seat frame 5 is slidable mounted in a longitudinal direction relative to the vehicle, as shown by the arrow 7 in FIG. 1. The linear position of the occupant 1 before impact is indicated at $X_1$, and the subsequent positions of the seat during impact are indicated at $X_2$ and $X_3$. The angular positions of the occupant are indicated at $O_1$ and $O_2$ while the corresponding linear position of the occupant is indicated at $Z_1$ and $Z_2$.

The details of the connection of the double acting hydraulic cylinder 4 between the vehicle seat frame 5 and vehicle frame 6 are illustrated in FIG. 3 and 4. The seat 2 is a conventional seat having a back rest 2a hingedly connected to the seat as at 8 and having the conventional control handles 9 and 10 for respectively adjusting the angular position of the seat rest 2a and linear position of the seat 2. The hydraulic motor 4 includes a cylinder 4a pivotally connected to the vehicle frame 6 as at 4b, and a piston rod 4c pivotally connected as at 4d to depending bracket 5a integral with seat frame 5. Movement of the seat frame 5 relative to the vehicle frame 6 is prevented by a solenoid actuated detent 11. The seat 2 is provided with a subframe 12 which is mounted on the seat frame 5 and linearly adjustable thereon by the control handle 10.

During a head on collision the detent 11 is retracted and hydraulic fluid is supplied to the hydraulic cylinder 4a in a controlled manner depending upon the angular motion, O, of the occupant and the seat position, X, to thereby extend the fluid motor 4, whereby a force is applied to the vehicle seat 2 in a direction opposite to the impact force, i.e., in the direction of arrow 7, FIG. 1.

Figure 7:
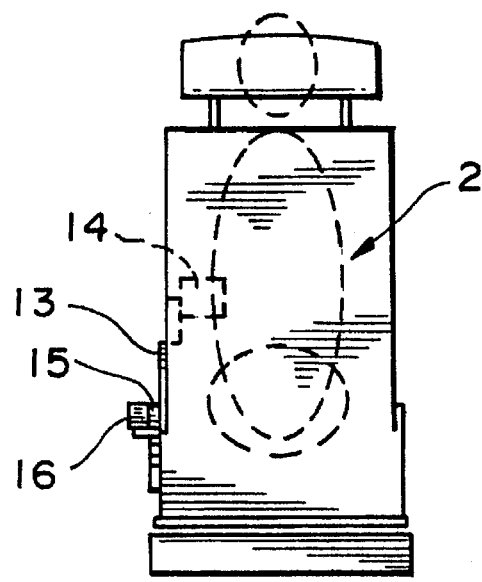
FIG. 7 is a diagrammatic view of the rear of the seat shown in FIG. 6.

FIGS. 6 and 7 illustrate the assembly for measuring the angular motion O of the occupant 1 during impact. A rigid strip 13 is connected at its upper end to the occupant's upper torso 1a by a clip 14. The lower end of the strip 13 is pivotally connected to the seat frame at 15; the pivotal connection also includes a rotary variable differential transformer (RVDT) 16.

The seat position, X, is measured by a linear variable differential transformer (LVDT) 17, FIG. 4, mounted between the seat frame 5 and vehicle frame 6.

Figure 8:
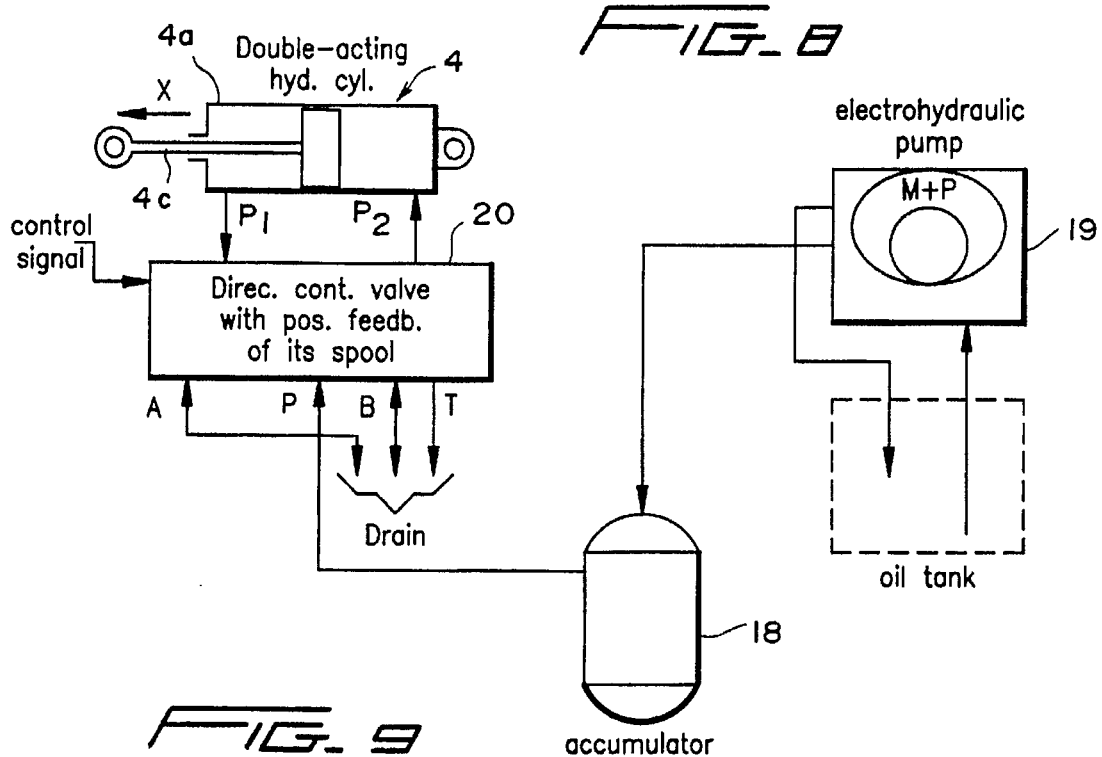
FIG. 8 is a schematic drawing of the hydraulic control circuit for the double acting hydraulic cylinder.

FIG. 8 illustrates the hydraulic circuit for the supply and exhaust of hydraulic circuit for the supply and exhaust of hydraulic fluid to the fluid motor 4. Hydraulic fluid is supplied to an accumulator 18 from a motor driven pump 19. The hydraulic fluid is fed from the accumulator 18 to a conventional directional control valve 20 of of the type disclosed in *Automotive Handbook*, 2nd Edition, published by Robert Bosch GmbH, 1986. From the control valve 20 the hydraulic fluid is directed to either port $P_1$ or $P_2$ of the fluid motor 4 to retract or extend the fluid motor 4, to thereby slide the seat 2 in a longitudinal direction.

Figure 9:
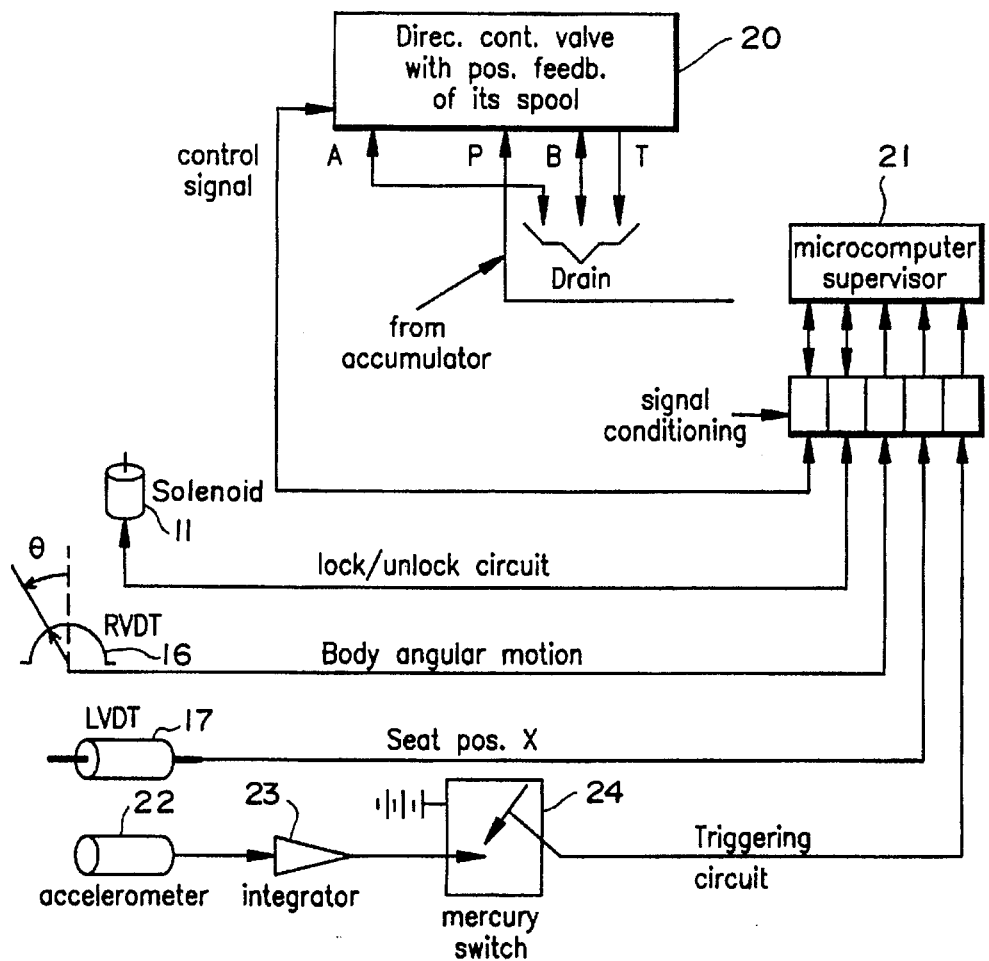
FIG. 9 is a schematic of the electrical circuit for actuating the directional control valve employed in the hydraulic circuit of FIG. 8.

The position of the spool within the control valve 20 is determined by a control signal fed to the control valve 20 from the electrical circuit shown in FIG. 9. Measurements of the occupant's angular position O are read by the RVDT 16, and the linear position, X, of the seat by LVDT 17. These measurements are fed to a microprocessor 21 which in turn sends a control signal to the directional control valve 20. As in automatic restraint systems, such as air bags and seat belt tightening systems, a triggering circuit is provided to ensure that the active control is not energized at low impact speeds. To this end, an accelerometer 22 is mounted on the vehicle and an integrator 23 and mercury switch 24 are included in the triggering circuit, whereby if an output signal from the integrator 23 exceeds a preset value, a signal is sent to the microprocessor 21 and transmitted there from to the solenoid 11 for the actuation thereof.

In the operation of the active control assembly of the present invention, under normal driving conditions the seat 2 is locked to the vehicle frame 6, and the directional control valve 20 is in the neutral position so that the fluid motor 4 is in the neutral or balanced position. In the event of a frontal collision the solenoid detent 11 is retracted to release the seat 2 from the vehicle frame 6. A signal from the microprocessor 21 in response to the signals from the RVDT 16 and LVDT 17 is transmitted to the directional control valve 20, whereby pressurized hydraulic fluid is fed through port $P_2$ into the fluid motor cylinder 4a to apply a force against the fluid motor piston in a direction opposite to the impact force, thereby arresting the extension of the piston rod 4c and resultant forward movement of the seat 2.

If the impact force from the frontal collision is greater than a further threshold limit, the vehicle's seat belt and/or air bag are actuated to dampen the remaining kinetic energy of the occupant.

After the force of the impact has dissipated, the selector valve 20 is actuated to supply hydraulic fluid to the fluid motor 4 to return the seat to the original position, whereby the solenoid detent 11 is actuated to once again lock the seat frame 5 to the vehicle frame 6.

From the above description, it will readily be apparent to those skilled in the art that the assembly of the present invention provides an active control for resisting the forward inertial movement of the vehicle occupant to protect the occupant's head and upper body from impacting the steering wheel or dashboard, and also preventing facial bone fractures and head-neck trauma experienced when only air bags and seat belts are employed.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An active control for damping a vehicle occupant's body motion during a frontal collision comprising, a vehicle frame, a seat frame slidably mounted on said vehicle frame, said seat frame being slidable along a longitudinal axis relative to the vehicle, a seat mounted on said seat frame, said seat adapted to support an occupant, a fluid motor connected between the vehicle frame and the seat frame, an hydraulic circuit connected to said fluid motor, and control means for measuring the seat position relative to the longitudinal axis of the Vehicle and the angular position of an occupant's upper torso relative to the lower torso for controlling the flow of hydraulic fluid to said fluid motor, whereby the impact from a frontal collision is dampened by energizing the fluid motor, to thereby apply a force to the vehicle seat in a direction opposite from the point of impact to dampen the forward linear movement of the seat.

2. An active control according to claim 1, wherein a solenoid actuated detent is mounted between the vehicle frame and seat frame for releasably holding the seat frame against sliding movement on said vehicle frame.

3. An active control according to claim 1, wherein the fluid motor comprises, a cylinder connected to the vehicle frame and a piston rod connected to the seat frame.

4. An active control according to claim 3, wherein the hydraulic circuit comprises, an hydraulic fluid reservoir, a motor driven pump, an accumulator, said motor driven pump communicating with said reservoir and said accumulator for supplying hydraulic fluid from said reservoir to said accumulator, and a directional control valve communicating with said accumulator and said cylinder, whereby pressurized hydraulic fluid is supplied to and exhausted from the cylinder for controlling the extension and retraction of said piston rod.

5. An active control according to claim 4, wherein, said control means comprises, a linear variable differential transformer operatively connected between the vehicle frame and seat frame for measuring the seat position relative to the longitudinal axis of the vehicle, a rotary variable differential transformer connected to the seat frame and means for connecting the rotary variable differential transformer to an, occupant in said seat for measuring the angular motion of the occupant's body, a microprocessor, and an electrical circuit connected between said linear and rotary variable differential transformers and said microprocessor, and between said microprocessor and said directional control valve, whereby signals are transmitted to the directional control valve from said microprocessor in response to signals from said linear and rotary variable differential transformers.

6. An active control according to claim 5, wherein the electrical circuit includes a triggering circuit, said triggering circuit comprises, an accelerometer mounted on said vehicle, an electrical circuit connecting said accelerometer to said microprocessor, and a solenoid actuated detent mounted between the vehicle frame and seat frame for releasably holding the seat frame against sliding movement on said vehicle frame, an electrical circuit connecting said solenoid actuated detent to said microprocessor, whereby during a frontal collision the accelerometer transmits a signal to the microprocessor which in turn transmits a responsive signal to the solenoid actuated detent, to thereby retract the detent to release the seat frame from the vehicle frame.

7. An active control according to claim 5, wherein the means for connecting the rotary variable differential transformer to an occupant of the seat comprises a rigid strip, one end of said rigid strip being connected to the occupant's upper torso, and the opposite end of the rigid strip being connected to the rotary variable differential transformer, whereby the angular motion of the occupant's upper torso relative to the lower torso is transmitted to the rotary variable differential transformer.

8. An active control for damping a vehicle occupant's body motion during a frontal collision comprising, a vehicle frame, a seat frame slidably mounted on said vehicle frame, said seat frame being slidable along a longitudinal axis relative to the vehicle, a seat mounted on said seat frame, said seat adapted to support an occupant, a fluid motor comprising a cylinder connected to the vehicle frame and a piston rod connected to the seat frame, an hydraulic circuit connected to said fluid motor, said hydraulic circuit comprising, an hydraulic fluid reservoir, a motor driven pump, an accumulator, said motor driven pump communicating with said reservoir and said accumulator for supplying hydraulic fluid from said reservoir to said accumulator, a directional control valve communicating with said accumulator and said cylinder, whereby pressurized hydraulic fluid is supplied to and exhausted from the cylinder for controlling the extension and retraction of said piston rod, and control means for controlling the flow of hydraulic fluid to said fluid motor, said control means comprising, a linear variable differential transformer operatively connected between the vehicle frame and seat frame for measuring the seat position relative to the longitudinal axis of the vehicle, a rotary variable differential transformer connected to the seat frame, a rigid strip, one end of said rigid strip being connected to the occupant's upper torso, the other end of said rigid strip being connected to said rotary variable differential transformer, whereby the angular motion of the occupant's upper torso related to the lower torso is measured, a microprocessor, and an electrical circuit connected between said linear and rotary variable differential transformers and said microprocessor, and between said microprocessor and said directional control valve, whereby signals are transmitted to the directional control valve from said microprocessor in response to signals from said linear and rotary variable differential transformers, thereby energizing the fluid motor to dampen the impact from a frontal collision by applying a force to the vehicle seat in a direction opposite from the point of impact to dampen the forward linear movement of the seat and associated occupant.

* * * * *